(12) United States Patent
Xue et al.

(10) Patent No.: US 9,868,159 B2
(45) Date of Patent: Jan. 16, 2018

(54) STEERING KNUCKLE DRILLING DEVICE

(71) Applicant: CITIC Dicastal CO., LTD, Qinhuangdao (CN)

(72) Inventors: Bowen Xue, Qinhuangdao (CN); Yacong Zhang, Qinhuangdao (CN); Jiandong Guo, Qinhuangdao (CN); Weidong Liu, Qinhuangdao (CN); Yao Zheng, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 0 days.

(21) Appl. No.: 15/152,779

(22) Filed: May 12, 2016

(65) Prior Publication Data

US 2016/0354885 A1 Dec. 8, 2016

(30) Foreign Application Priority Data

Jun. 2, 2015 (CN) .......................... 2015 1 0294318

(51) Int. Cl.
| | |
|---|---|
| *B23Q 3/06* | (2006.01) |
| *B23B 41/00* | (2006.01) |
| *B62D 7/18* | (2006.01) |
| *B23Q 3/18* | (2006.01) |
| *B25B 1/24* | (2006.01) |

(52) U.S. Cl.
CPC ............... *B23B 41/00* (2013.01); *B62D 7/18* (2013.01); *B23Q 3/061* (2013.01); *B23Q 3/18* (2013.01); *B25B 1/24* (2013.01); *Y10T 408/563* (2015.01)

(58) Field of Classification Search
CPC .......... B23Q 3/06; B23Q 3/061; B23Q 3/186; B23Q 3/18; B25B 1/00; B25B 1/24; B25B 1/2468; B25B 1/2484; B25B 5/14; B25B 11/02; Y10T 408/10; Y10T 408/39; Y10T 408/563; Y10T 408/5638
USPC .......................... 269/55, 71, 45, 43, 291, 32
See application file for complete search history.

(56) References Cited

U.S. PATENT DOCUMENTS

| | | | | |
|---|---|---|---|---|
| 2,496,379 A | * | 2/1950 | Cox ........................ | B23B 41/12 269/238 |
| 3,127,795 A | * | 4/1964 | Quick .................... | B23B 41/12 408/103 |
| 7,618,028 B2 | * | 11/2009 | Huisken ................. | B23Q 3/062 269/63 |
| 8,042,240 B2 | * | 10/2011 | Mitsui ..................... | B23Q 3/18 198/346.2 |
| 9,669,501 B1 | * | 6/2017 | Dolan .................... | B23P 19/04 |

* cited by examiner

*Primary Examiner* — Daniel Howell
*Assistant Examiner* — Chwen-Wei Su
(74) *Attorney, Agent, or Firm* — Maier & Maier, PLLC

(57) ABSTRACT

Disclosed is a steering knuckle drilling device, including a drilling machine, a bottom plate, guide rails, hydraulic cylinders, fixtures, a support post and a support block. When in use, the present invention can simultaneously drill the left and right symmetric workpieces of a steering knuckle and can conveniently install and dismount the workpieces.

1 Claim, 2 Drawing Sheets

STEERING KNUCKLE DRILLING DEVICE

TECHNICAL FIELD

The present invention relates to a machining device, and particularly to a drilling device.

BACKGROUND ART

Due to characteristics of the unique spatial structure as well as special functions, the automobile steering knuckle workpiece generally needs the left workpiece and right workpiece to be used in pairs; however, since the left workpiece and right workpiece are different in structure, two sets of fixtures are needed under normal circumstances in machining to respectively machine the left and right workpieces, thus not only increasing the machining cost, but also bringing about adverse impact on the machining efficiency. Even when the left workpiece and right workpiece are fixed on one fixture to be simultaneously machined, it is very inconvenient to install and dismount the workpieces as the limitation of the workpiece structure and the working space exists; the present invention provides a combination fixture, which can satisfy the simultaneous machining of the left and right workpieces of the steering knuckle and realize the convenience in clamping and dismounting.

SUMMARY OF THE INVENTION

An object of the present invention is to provide a drilling device capable of simultaneously drilling left and right symmetric workpieces of a steering knuckle, which is particularly convenient for clamping and dismounting the workpieces.

In order to accomplish the aforementioned object, a technical solution of the present invention is that: a steering knuckle drilling device consists of a drilling machine, a guide rail I, a bottom plate, a hydraulic cylinder I, a double-shaft air cylinder, a positioning lock, a fixture I, a feeler block, a support block, a guide post, a hydraulic cylinder II, a support post, a fixture II, a sliding plate, a guide rail II, a hydraulic cylinder III, a guide rail and a hydraulic cylinder IV, the bottom plate is fixed above a worktable of the drilling machine by means of the guide rail I; the hydraulic cylinder I is also fixed above the worktable of the drilling machine, and the output end of the hydraulic cylinder I is connected with a side vertical plate of the bottom plate; the double-shaft air cylinder with the output end provided with the positioning lock is fixed on the side vertical plate of the bottom plate; the fixture I is installed on a fixed position above the bottom plate; the fixture II is fixed above the bottom plate by means of the guide rail II; the hydraulic cylinder III is fixed on the side of the bottom plate, and the output end of the hydraulic cylinder IIII is connected with the fixture II; the support post with the top end provided with the feeler block is fixed above the sliding plate, and the sliding plate is also fixed above the bottom plate by means of the guide rail III; the output end of the hydraulic cylinder IV fixed on the side of the bottom plate is connected with the sliding plate; the guide post with the left end provided with the support block is matched with the support post, the hydraulic cylinder II is installed at the right side of the support post, and the output end of the hydraulic cylinder II is connected with the guide post.

In use, the hydraulic cylinder I pushes out the bottom plate by means of the guide rail I; a steering knuckle left workpiece is clamped on the fixture I, a right workpiece is clamped on the fixture II, the hydraulic cylinder III pushes the fixture II forward by means of the guide rail II until the fixture II contacts the fixture I and stops, at this moment, the double-shaft air cylinder pushes the positioning lock forward to be simultaneously inserted into the fixture I and fixture II so as to fix the positions of the two fixtures, and center lines of four machined holes of the fixed steering knuckle left workpiece and right workpiece are coaxial; the hydraulic cylinder IV pushes the support post onto a corresponding position by means of the guide rail III, the hydraulic cylinder II enables the support block to play a role in supporting two symmetric steering knuckle workpieces by means of the guide post, after the workpieces are fixed, the hydraulic cylinder I withdraws the bottom plate, and the drilling machine begins to machine the workpieces.

In use, the present invention can simultaneously drill the left and right symmetric workpieces of the steering knuckle and can conveniently clamp and dismount the workpieces; meanwhile, the present invention has prominent advantages of high machining efficiency, advanced machining process, high positioning precision, firmness in positioning, high machining efficiency, etc.

Figure 1:
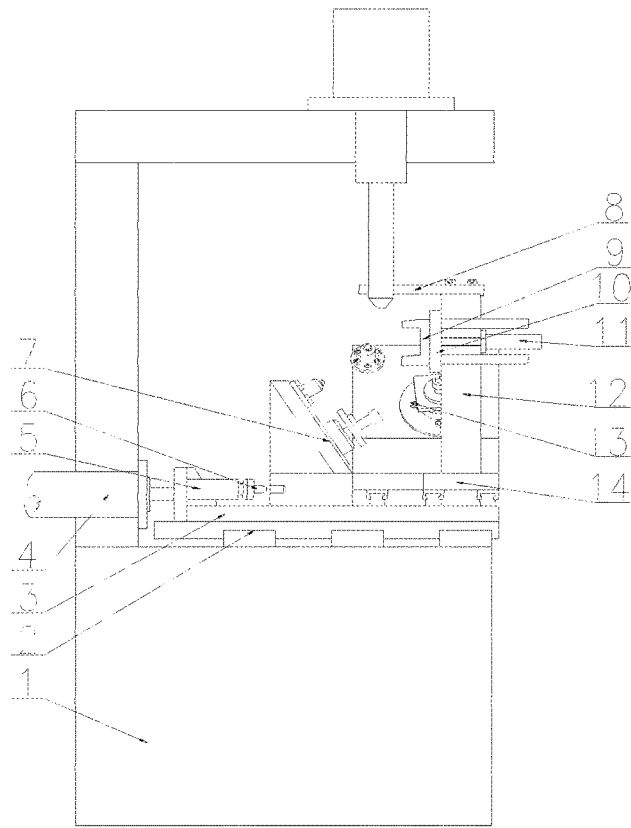
FIG. 1 is a front view of the steering knuckle drilling device of the present invention.
Figure 2:
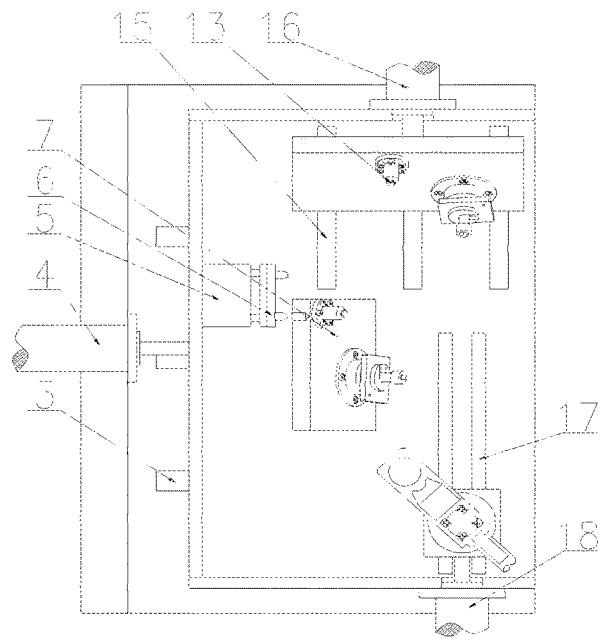
FIG. 2 is a top view of the steering knuckle drilling device of the present invention.
Figure 3:
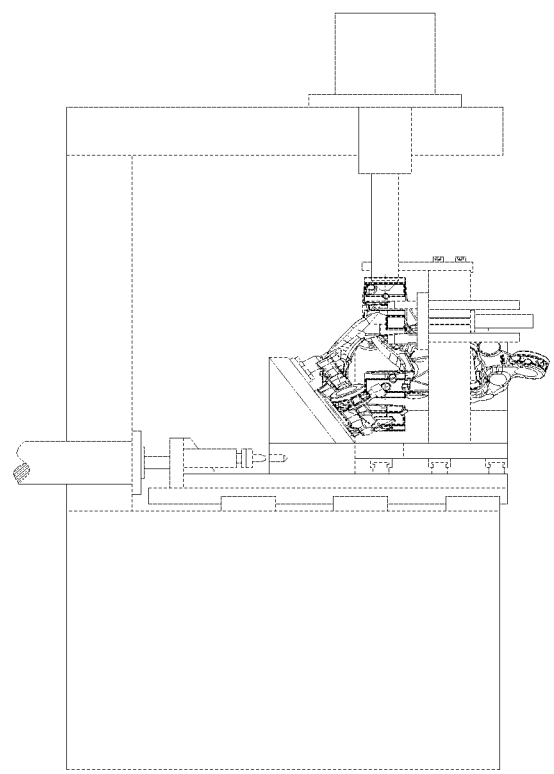
FIG. 3 is a front view of the steering knuckle drilling device of the present invention in work.
Figure 4:
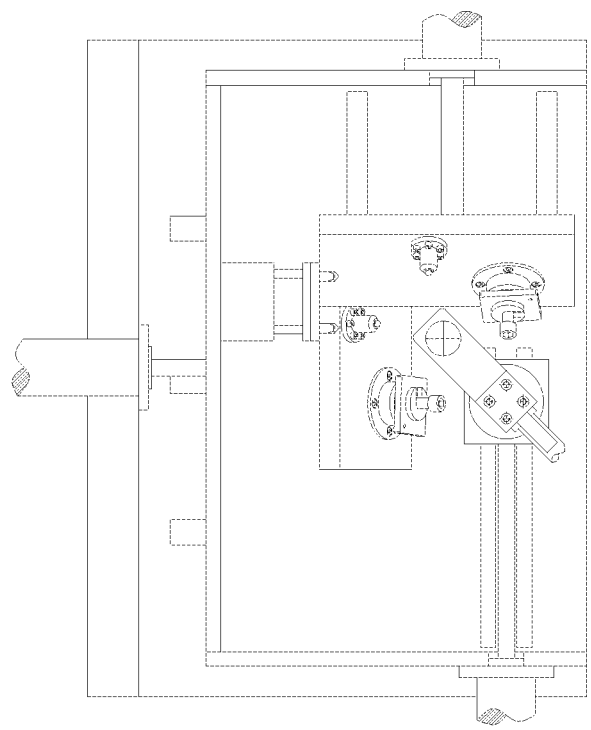
FIG. 4 is a top view of the combined steering knuckle drilling device of the present invention.

In the figures, 1—drilling machine, 2—guide rail I, 3—bottom plate, 4—hydraulic cylinder I, 5—double-shaft air cylinder, 6—positioning lock, 7—fixture I, 8—feeler block, 9—support block, 10—guide post, 11—hydraulic cylinder II, 12—support post, 13—fixture II, 14—sliding plate, 15—guide rail II, 16—hydraulic cylinder III, 17—guide rail III, 18—hydraulic cylinder IV.

DETAILED DESCRIPTION OF THE INVENTION

Details and working conditions of a specific device set forth according to the present invention are described below with reference to the drawings.

The device consists of a drilling machine 1, a guide rail I 2, a bottom plate 3, a hydraulic cylinder I 4, a double-shaft air cylinder 5, a positioning lock 6, a fixture I 7, a feeler block 8, a support block 9, a guide post 10, a hydraulic cylinder II 11, a support post 12, a fixture II 13, a sliding plate 14, a guide rail II 15, a hydraulic cylinder III 16, a guide rail III 17 and a hydraulic cylinder IV 18, wherein the bottom plate 3 is fixed above a worktable of the drilling machine 1 by means of the guide rail I 2; the hydraulic cylinder I 4 is also fixed above the worktable of the drilling machine 1, and the output end of the hydraulic cylinder I 4 is connected with a side vertical plate of the bottom plate 3; the double-shaft air cylinder 5 with the output end provided with the positioning lock 6 is fixed on the side vertical plate of the bottom plate 3; the fixture I 7 is installed on a fixed position above the bottom plate 3; the fixture II 13 is fixed above the bottom plate 3 by means of the guide rail II 15; the hydraulic cylinder III 16 is fixed on the side of the bottom plate 3, and the output end of the hydraulic cylinder III 16 is connected with the fixture II 13; the support post 12 with the top end provided with the feeler block 8 is fixed above the sliding plate 14, and the sliding plate 14 is also fixed above the bottom plate 3 by means of the guide rail III 17; the output end of the hydraulic cylinder IV 18 fixed on the side of the bottom plate 3 is connected with the sliding plate 14; the guide post 10 with the left end provided with the support block 9 is matched with the support post 12, the hydraulic cylinder II 11 is installed at the right side of the support post 12, and the output end of the hydraulic cylinder II is connected with the guide post 10.

In the working process, the hydraulic cylinder I 4 pushes out the bottom plate 3 by means of the guide rail I 2; the steering knuckle left workpiece is clamped on the fixture I 7, the right workpiece is clamped on the fixture II 13, the hydraulic cylinder III 16 pushes the fixture II 13 forward by means of the guide rail II 16 until the fixture II contacts the fixture I 7 and stops, at this moment, the double-shaft air cylinder 5 pushes the positioning lock 6 forward to be simultaneously inserted into the fixture I 7 and fixture II 13 so as to fix the positions of the two fixtures, and center lines of four machined holes of the fixed steering knuckle left workpiece and right workpiece are coaxial; the hydraulic cylinder IV 18 pushes the support post 12 onto a corresponding position by means of the guide rail III 17, the hydraulic cylinder II 11 enables the support block 9 to play a role in supporting two symmetric steering knuckle workpieces by means of the guide post 10 to prevent the vibration of cutters when in machining, after the workpieces are fixed, the hydraulic cylinder I 4 withdraws the bottom plate 3, and the drilling machine 1 begins to machine the workpieces.

The invention claimed is:
1. A steering knuckle drilling device, comprising:
a drilling machine, a guide rail I, a bottom plate, a hydraulic cylinder I, a double-shaft air cylinder, a positioning lock, a fixture I, a feeler block, a support block, a guide post, a hydraulic cylinder II, a support post, a fixture II, a sliding plate, a guide rail II, a hydraulic cylinder III, a guide rail III and a hydraulic cylinder IV, wherein the bottom plate is fixed above the worktable of the drilling machine by the guide rail I; the hydraulic cylinder I is also fixed above the worktable of the drilling machine, and the output end of the hydraulic cylinder I is connected with a side vertical plate of the bottom plate; the double-shaft air cylinder with the output end provided with the positioning lock is fixed on the side vertical plate of the bottom plate; the fixture I is installed on a fixed position above the bottom plate; the fixture II is fixed above the bottom plate by the guide rail II; the hydraulic cylinder III is fixed on one side of the bottom plate, and the output end of the hydraulic cylinder III is connected with the fixture II; the support post with the top end provided with the feeler block is fixed above the sliding plate, and the sliding plate is also fixed above the bottom plate by the guide rail III; the output end of the hydraulic cylinder IV fixed on the other side of the bottom plate is connected with the sliding plate; the guide post with the left end provided with the support block is matched with the support post, the hydraulic cylinder II is installed at a right side of the support post, and the output end of the hydraulic cylinder II is connected with the guide post;
wherein during operation, the hydraulic cylinder I pushes out the bottom plate by means of the guide rail I; a left workpiece of the steering knuckle is clamped on the fixture I, a right workpiece of the steering knuckle is clamped on the fixture II, the hydraulic cylinder III pushes the fixture II forward by means of the guide rail II until the fixture II contacts the fixture I and stops, then the double-shaft air cylinder pushes the positioning lock forward to simultaneously insert into the fixture I and fixture II so as to fix the positions of the two fixtures, and center lines of four machined holes of the fixed left workpiece and right workpiece of the steering knuckle are coaxial; the hydraulic cylinder IV pushes the support post onto a corresponding position by means of the guide rail III, the hydraulic cylinder II enables the support block to play a role in supporting the two workpieces of the steering knuckle by means of the guide post to prevent vibration of cutters during machining.

* * * * *